Feb. 25, 1969 F. J. BILTZ 3,430,101
VOLTAGE CONVERTER UTILIZING A LEADING CONTROL VOLTAGE
Filed Jan. 27, 1966 Sheet 1 of 2

INVENTOR.
FRANCIS J. BILTZ
BY Merchant + Gould
ATTORNEYS

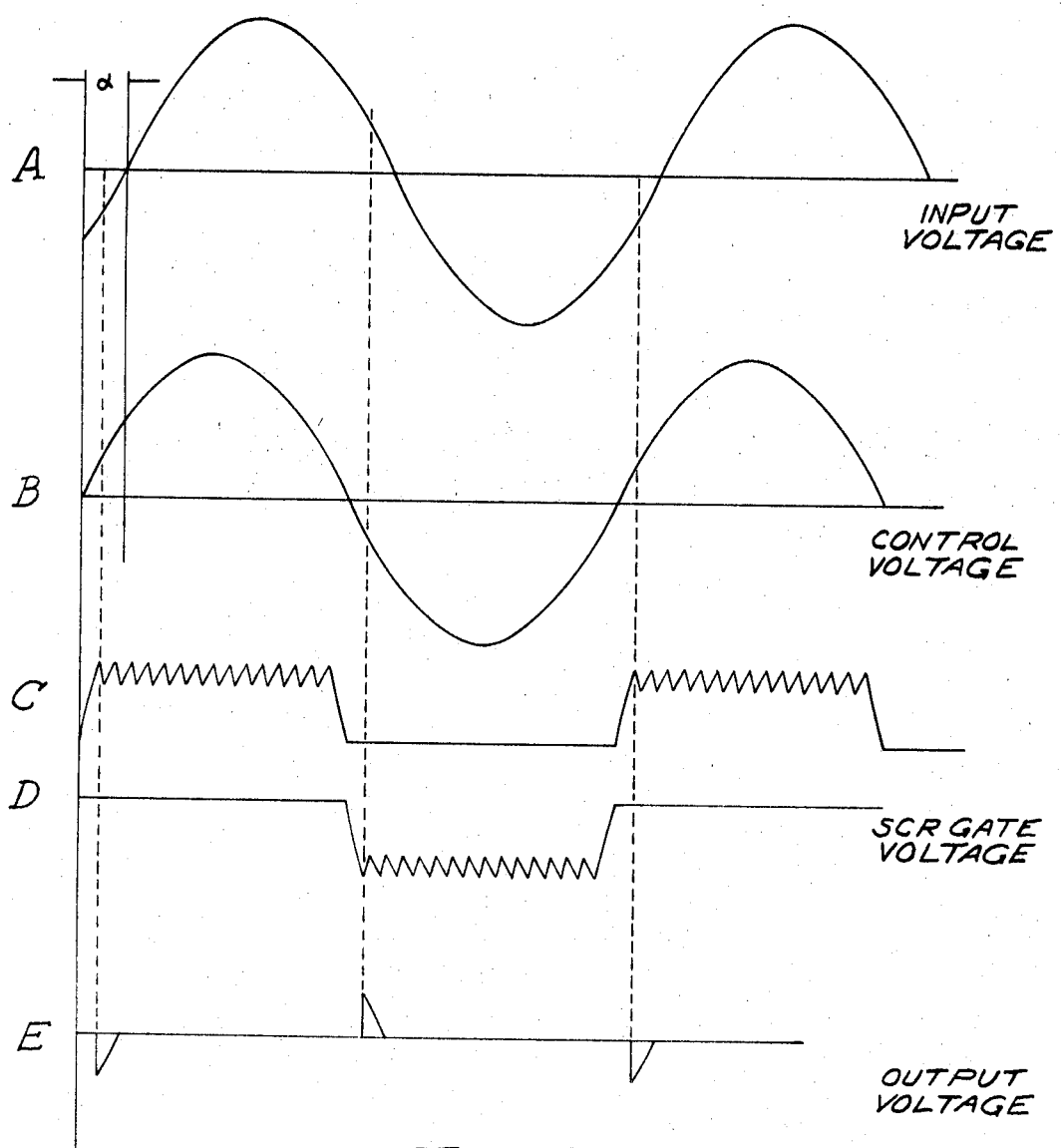

United States Patent Office 3,430,101
Patented Feb. 25, 1969

3,430,101
VOLTAGE CONVERTER UTILIZING A LEADING CONTROL VOLTAGE
Francis J. Biltz, 5638 Glen Ave., Minnetonka, Minn. 55343
Filed Jan. 27, 1966, Ser. No. 523,456
U.S. Cl. 315—194                10 Claims
Int. Cl. G05f 1/12; H05b 37/02

ABSTRACT OF THE DISCLOSURE

Electronic apparatus including an input having an input signal applied thereto, a phase shifting network receiving the input signal and producing a control voltage with a phase leading the input signal, and a silicon controlled rectifier connecting the input signal to an output circuit only during the periods when the input signal and the control signal are of opposite polarity and the control signal is above a predetermined magnitude required to activate the SCR.

---

This invention pertains to apparatus for converting an alternating input voltage to an output voltage having some lower desired R.M.S. (root mean square) amplitude and more particularly to a small compact voltage converter utilizing a standard input voltage, such as 115 volt 60 cycle, and providing energization for a low voltage, high intensity light source or the like.

In prior art voltage converters it is generally necessary to provide at least one transformer in the circuit, which transformer may be a power transformer to step down the input voltage or may be a pulse transformer to provide a control voltage, or triggering pulses, to some electronic circuitry. In these prior art devices if a partial conduction angle is used to acquire the proper output voltage, a control voltage which lags the input voltage is utilized. The lagging control voltage is again acquired through the use of a transformer, or the like. These transformers add a large amount of cost and weight to the overall voltage converter unit as well as greatly increasing the size thereof. Also, the prior art voltage converters are highly susceptible to changes in control voltage and component characteristics as well as temperature changes, etc.

In the present invention the alternating input voltage is applied to phase shifting means which provide a control voltage having a leading phase relationship relative to the input voltage rather than a lagging phase relationship. This control voltage is applied to pulse-producing means which provide at least one pulse per cycle of control voltage having a polarity opposite to that of the input voltage at that instant of time. The particular pulse of interest (there may be more than one) is produced shortly after the control voltage crosses the reference or zero point and before the input voltage reaches it. This pulse is then applied to a gate circuit of switching means and activates the switching means, thereby, connecting the input voltage to the output terminals. The switching means remains in the conducting state until the input voltage reaches the reference point or zero voltage.

The present voltage converter has the advantage of being extremely small and compact since no transformers are utilized in the circuitry. Also, because of the unique triggering action of the present voltage converter, the output voltage is relatively stable and insensitive to changes in the characteristics of the various components and/or the control voltage. Also, because of the characteristics of certain components which may be utilized in the present converter, as will be explained presently, the output voltage is substantially stable over a relatively wide temperature range.

It is an object of the present invention to provide a new and improved voltage converter.

It is a further object of the present invention to provide a voltage converter without transformers in the circuitry and which, therefore, is extremely small and compact.

It is a further object of the present invention to provide a voltage converter which produces a relatively stable output voltage throughout changes in characteristics of the components and relatively linear changes in output voltage for fluctuations of the control voltage.

It is a further object of the present invention to provide a voltage converter which produces a relatively stable output voltage over a relatively wide temperature range.

These and other objects of this invention will become apparent to those skilled in the art upon consideration of the accompanying specification, claims, and drawings.

Referring to the drawings, wherein like characters indicate like parts throughout the figures:

FIG. 2 illustrates typical curves appearing at various points in the voltage converter;

Figure 1:
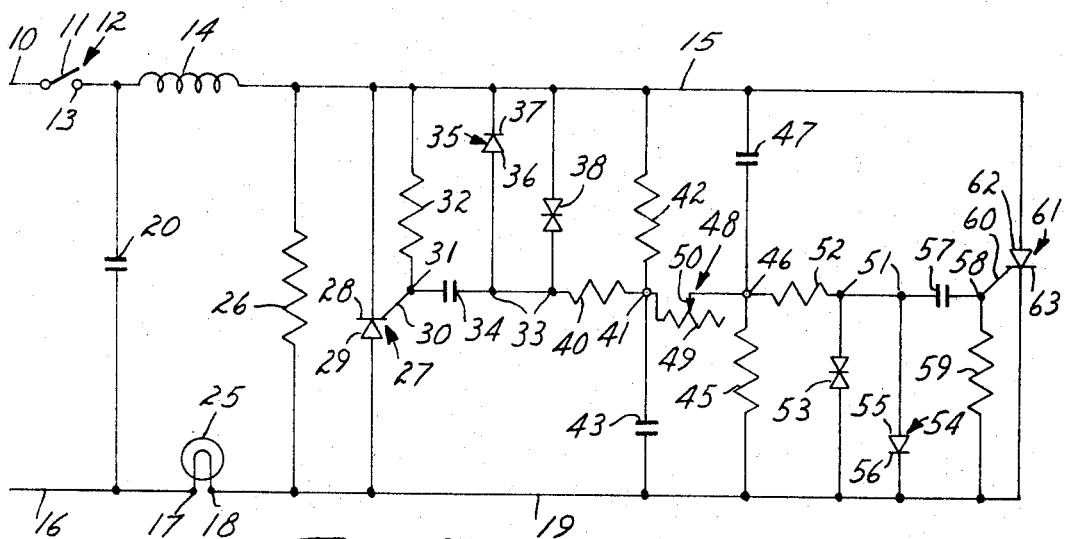
FIG. 1 is a schematic wiring diagram of the present voltage converter.

In FIG. 1 one end of an input lead 10 is connected to the movable contact 11 of a switch generally designated 12. A stationary contact 13 of the switch 12 is connected to one end of an RF choke 14. The other end of the RF choke 14 is connected to a lead 15. A second input lead 16 is connected to one output terminal 17. A second output terminal 18 is connected to a lead 19. One side of a noise suppression capacitor 20 is connected to the junction between the contact 13 and the RF choke 14. The other side of the capacitor 20 is connected to the input lead 16. The input leads 10 and 16 are adapted to have applied thereto an input voltage which is alternating in polarity. The RF choke 14 acts as a constant current source to high frequency noise while the capacitor 20 provides a short circuit for high frequency noise so that the voltage appearing between the line 15 and the output terminal 17 is a substantially noise free alternating voltage.

The output terminals 17 and 18 are adapted to have connected thereacross a load, which may be for example, a high intensity, low voltage light source 25 as illustrated. It should be understood that the present voltage converter might be utilized for many purposes and using the present converter as a power supply for a low voltage light source is simply one application. In the following explanation a 12 volt light source is utilized and the figures illustrate the proper schematics and approximate wave forms for a 12 volt R.M.S. output.

One end of a resistor 26 is connected to the line 15 and the other end is connected to the line 19. The resistor 26 is utilized to suppress any oscillations of the noise filter, consisting of RF choke 14 and capacitor 20, which might occur if the input voltage across the input leads 10 and 16 is intermittently applied. When an input voltage is applied to the noise filter and then suddenly removed there is a strong tendency for the noise filter to produce oscillations which will adversely affect the following circuitry. The resistor 26 provides a circuit for these oscillations so that they are quickly suppressed and do not pass through the following circuitry.

An SCR (silicon controlled rectifier) 27 has a cathode 28 connected to the line 15, an anode 29 connected to the line 19 and a gate circuit 30 connected to a junction 31.

The junction 31 is connected to the line 15 by a resistor 32 and to a second junction 33 by a capacitor 34. A semiconductor diode 35 has an anode 36 connected to the junction 33 and a cathode 37 connected to the line 15. One side of a bilateral or symmetrical semi-conductor diode 38 is connected to the junction 33 and the other side is connected to the line 15. The symmetrical diode 38 provides a high resistance to electrical current therethrough until the voltage applied reaches a predetermined value, known as the breakover voltage. Once the breakover voltage of the symmetrical diode 38 is reached, it provides substantially a short circuit for current. Although the symmetrical diode 38 has a breakover voltage of either polarity and will conduct current in either direction, in the present converter it is only utilized to conduct current from the line 15 to the terminal 33 and any device having a stable breakover voltage of the desired amplitude might be utilized in place of the symmetrical diode 38.

A resistor 40 connects the junction 33 to a junction 41. A phase shifting network is comprised of a resistor 42, connected between the line 15 and the junction 41, and a capacitor 43, connected between the line 19 and the junction 41. A second phase shifting network is comprised of a resistor 45, connected between the line 19 and a junction 46, and a capacitor 47, connected between the line 15 and the junction 46. The junctions 41 and 46 are connected together by a variable resistor 48, which has one end of a resistive element 49 attached to the junction 41 and a variable tap 50 connected to the junction 46.

The junction 46 in the second phase shifting network is connected to a junction 51 by a resistor 52. A symmetrical diode 53, similar to the symmetrical diode 38, is connected between the junction 51 and the line 19. A diode 54, similar to the diode 35, has an anode 55 connected to the junction 51 and a cathode 56 connected to the line 19. A capacitor 57 connects the junction 51 to a junction 58. The junction 58 is connected to the line 19 by a resistor 59. The junction 58 is also connected to a gate circuit 60 of an SCR 61. The SCR 61 has an anode 62 which is connected to the line 15 and a cathode 63 which is connected to the line 19.

In FIG. 2 five waveforms are shown which illustrate approximately the voltages that may be expected at various points in the schematic of FIG. 1. The waveform A in FIG. 2 is the sinusoidal input voltage which is applied between the input leads 10 and 16. The waveform B illustrated in FIG. 2 is the sinusoidal control voltage and appears across the resistors 42 and 45 of the phase shifting networks. The waveform C illustrated in FIG. 2 is the voltage which appears across the symmetrical diode 38 and the waveform D illustrated in FIG. 2 is the voltage which appears across the symmetrical diode 53. The waveforms C and D are approximately double their actual amplitude so that the details thereof may be seen more clearly. In this particular application the peak voltage in the waveforms C and D is approximately 30 volts while the waveform A is a standard 120 volt 60 cycle sine wave having a peak of approximately 170 volts. The waveform B is of the same order of amplitude as the waveform A although it would be somewhat diminished by losses in the circuitry, etc. The waveform E is the output voltage which will appear across the output terminals 17 and 18. The R.M.S. value of the voltage illustrated by waveform E is approximately 12 volts.

The operation of the circuitry illustrated in FIG. 1 is as follows. The noise filter consisting of the RF choke 14 and the capacitor 20 have little or no effect on the 60 cycle alternating waveform A illustrated in FIG. 2 and, therefore, substantially the same waveform will appear between the lines 15 and 16. The purpose of the noise filter is to attenuate the radio frequency noise generated by the present circuit and conducted back into the line 10–16. Ignoring the load 25 for the moment, the waveform A illustrated in FIG. 2 will appear between the lines 15 and 19 across the two phase shifting networks. Since the phase shifting networks are composed of R-C networks, the waveforms will remain substantially sinusoidal. Also, since the voltage lags the current in a capacitive reactance, the voltage must lead the current in a resistance in series with the capacitive reactance so that the overall or resultant voltage will be in phase with the current. Thus, the voltage waveform B across the resistors 42 and 45 is substantially as illustrated in FIG. 2(b) and leads the input voltage by some predetermined angle α. The magitude of the angle α by which the control voltage, or the voltage across the resistors 42 and 45, leads the input voltage is determined by the values of the resistors and capacitors in the two phase shifting networks.

When the voltage across the resistor 42 in the first phase shifting network is such that the junction 41 is negative with respect to the line 15 the voltage at the junction 33 is also negative with respect to the line 15. The diode 35 will not conduct since the voltage at the junction 33 biases it in a reverse direction. Also, the symmetrical diode 38 will not conduct until its breakover voltage is reached and, therefore, the capacitor 34 begins to charge as indicated by the first portion of the waveform C in FIG. 1. The capacitor 34 charges so that the junction 31 is positive with respect to the junction 33. As the capacitor 34 charges the junction point 33 gradually becomes more negative with respect to the line 15 until the breakover voltage of the symmetrical diode 38 is reached. As previously stated, in this embodiment the breakover voltage of the symmetrical diode 38 is approximately 30 volts and is indicated by the first peak of the waveform C illustrated in FIG. 2. When the symmetrical diode 38 begins to conduct a discharge path for the capacitor 34 is completed through the gate circuit 30 of the SCR 27 to the line 15 and through the symmetrial diode 38. The resistor 32 is connected in parallel with the gate circuit 30 to provide bias stability and to prevent the voltage applied to the gate circuit 30 from exceeding is maximum rated magnitude. Since the resistance in this discharge path is very small the discharge is extremely fast and the voltage across the symmetrical diode 38 quickly drops. When the voltage across the symmetrical diode 38 drops below a voltage known as the breakback voltage conductance through the symmetrical diode 38 stops and the capacitor 34 begins to charge again. This entire operation continues as long as the terminal 41 is negative with respect to the line 15 and the plurality of small pulses illustrated in the first portion of the waveform C are produced. Thus, the symmetrical diode 38 and the capacitor 34 operate as a pulse producing means in conjunction with the gate circuit 30 of the SCR 27.

As the control voltage across the resistor 42 passes through the reference or zero point and the terminal 41 begins to go positive with respect to the line 15, the terminal 33 begins to go positive with respect to the line 15. As the terminal 33 becomes positive with respect to the line 15 the diode 35 begins to conduct and the capacitor 34 remains in a discharged state. This mode of operation continues as long as the terminal 41 is positive with respect to the line 15 and is illustrated by the midportion, or straight line portion, of the waveform C.

Referring to the operation of the second phase shifting network, consisting of resistor 45 and capacitor 47, and the associated circuitry, the control voltage waveform across the resistor 45 is the same as the control voltage waveform B across the resistor 42 and is illustrated in FIG. 2. During the first portion of the control voltage waveform the terminal 46 is less negative than the line 19 measured with respect to the line 15 and, therefore, terminal 46 is positive with respect to the line 19. Also, the terminal 51 is positive with respect to the line 19. Because the anode 55 of the diode 54 is attached to the terminal 51 the diode 54 conducts and the capacitor 57 remains in a discharge state. This mode of operation is illustrated by the first portion, or the straight line portion, of the waveform D illustrated in FIG. 2.

As the control voltage passes through the reference or zero line the terminal 46 becomes less positive than the line 19 measured with respect to the line 15 and, therefore, terminal 46 is negative with respect to the line 19. Also, the terminal 51 becomes negative with respect to the line 19. Thus, the capacitor 57 begins to charge and the voltage appearing at the terminal 51 increases in amplitude. When the voltage between the terminal 51 and the line 19 reaches the breakover point of the symmetrical diode 53 a discharge path is completed for the capacitor 57 through the gate circuit 60 of the SCR 61 and the symmetrical diode 53. The resistor 59 is connected in parallel with the gate circuit 60 to prevent the voltage applied to the gate circuit 60 from exceeding its maximum rated magnitude. Again the capacitor 57 discharges very fast and the breakback voltage of the symmetrical diode 53 is quickly reached after which the capacitor 57 begins to charge again. This mode of operation continues as long as the terminal 46 is negative with respect to the line 19 and the voltage waveform D illustrated at the midsection of the FIG. 2 is produced. Thus, the symmetrical diode 53 and the capacitor 57 operate as a pulse producing means in conjunction with the gate circuit 60 of the SCR 61.

Each time the capacitors 34 or 57 discharge through the gate circuits 30 or 60 respectively the SCR's 27 and 61 are triggered. When the SCR 27 is triggered current flows therethrough from the line 19 to the line 15 as long as the line 19 is positive with respect to the line 15. In a like manner, when the SCR 61 is triggered, current flows therethrough from line 15 to the line 19 as long as the line 15 is positive with respect to the line 19.

Referring to the input voltage waveform A and assuming that the instantaneous voltage on the line 15 with respect to the line 19 is indicated by this waveform, it can be seen that line 15 is negative with respect to the line 19 at the start of the waveform and is sinusoidally approaching the reference or zero point. During the period of time in which the line 15 is negative with respect to the line 19 the first pulse illustrated in waveform C is applied through the gate circuit 30 of the SCR 27. This pulse triggers the SCR 27 and current is allowed to flow from line 19 to line 15. Once the SCR 27 is triggered, current continues to flow therethrough as long as the line 19 is positive with respect to the line 15 and a pulse of voltage is produced across the output terminals 17 and 18, which is illustrated by the first pulse in the waveform E.

When the control voltage crosses the reference point and begins to go negative in the waveform B a voltage pulse is produced by the capacitor 57 discharging through the gate circuit 60, which pulse is the first in the train of pulses illustrated in waveform D. At the time that this pulse appears at the gate circuit 60 the line 15 is still positive with respect to the line 19, as illustrated in waveform A, and current flows through the SCR 61 from the line 15 to the line 19. This flow of current produces a pulse of voltage across the output terminals 17 and 18 which is illustrated as the second pulse in waveform E. Thus, at some point on the trailing edge of each half cycle of the input voltage one of the SCR's 27 or 61 conduct and allow current to flow through the load 25 for the remainder of the half cycle of input voltage then present. The point at which the SCR's 27 or 61 conduct and the phase angle α between the input voltage and the control voltage determine the R.M.S. amplitude of the output voltage.

Since the main triggering pulse, which is the first pulse appearing in each of the trains of pulses of waveforms C and D, is produced at the steeply rising portion of the control voltage, slight changes in the characteristics of the SCR's 27 and 61 or the breakover voltages of the symmetrical diodes 38 and 53 have very little effect on the output voltage. A 1% change in the breakover voltage of the symmetrical diodes 38 and 53 causes approximately 0.3% change in the output voltage. Also, although the waveforms in FIG. 2 illustrate the SCR's being triggered at the peak of the first pulse in each of the trains of pulses in waveforms C and D, it should be understood that the SCR's 27 and 61 would actually be triggered somewhere along the leading edge of the pulses so that changes in the triggering charactersitics of the SCR's 27 and 61 and the breakover voltages of the symmetrical diodes 38 and 53 would have very little or no effect on the output voltage.

Referring to FIG. 1 the variable resistor 48 connected between the terminals 41 and 46 of the two phase shifting networks is included to illustrate one possible means of producing a variable output voltage. It should be understood that the variable resistor 48 is simply an added feature and the circuitry will operate as previously described with no resistance between the terminals 41 and 46. As the resistance between the terminals 41 and 46 is decreased from a maximum the output voltage decreases from the maximum, which in this case is 12 volts R.M.S. Thus, in the event that the load 25 is a light source the variable resistor 48 acts as a dimmer. The variable resistor 48 actually operates to reduce the amount of phase shift of the control voltage relative to the input voltage at the junctions 41 and 46. This can be seen by referring to the extreme cases, when the resistance between the junctions 41 and 46 is a maximum, or an open circuit, the two circuits operate as previously described and the phase shift between the control voltage and the input voltage is as illustrated in FIG. 2. When the resistance between the junctions 41 and 46 is a minimum, or a short circuit, the two junctions 41 and 46 are at the same voltage and, thus, the same phase. As the resistance 48 is varied between the two extremes, the phase angle between the control voltage and the input voltage is varied between the two extremes to vary the output voltage.

Figure 4:
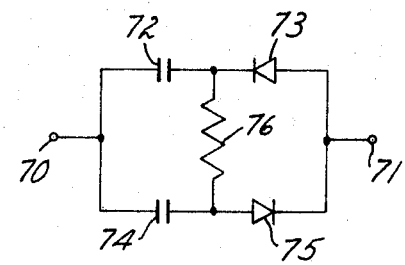
FIG. 4 is a schematic wiring diagram of an automatic surge compensating network for use with the apparatus illustrated in schematic form in FIG. 1.

Referring to FIG. 4 an automatic surge compensating circuit is illustrated which is utilized to prevent high initial surges of current to the SCR's 27 and 61 due to a cold load 25. This is especially important when the load 25 is a light source such as a tungsten filament lamp and initially the tungsten filament is cold, thereby having a low resistance, which resistance changes considerably as the tungsten filament heats. In FIG. 4 a pair of terminals 70 and 71 are adapted to be connected to the terminals 41 and 46 respectively of the circuit in FIG. 1. The automatic surge compensating circuit illustrated in FIG. 4 may be utilized separately or in conjunction with the variable resistor 48. A first capacitor 72 and a diode 73 are connected in series between the terminals 70 and 71, with the anode of the diode 73 connected to the terminal 71. A second capacitor 74 and a diode 75 are connected in series between the terminals 70 and 71 with the cathode of the diode 75 connected to the terminal 71. One end of a resistor 76 is connected to the junction of the capacitor 72 and the diode 73 and the other end of the resistor 76 is connected to the junction of the capacitor 74 and the diode 75.

The automatic surge compensating circuit of FIG. 4 operates as a delay circuit in the following manner. When the switch 12 of FIG. 1 is initially closed, the compensating circuit of FIG. 4, connected between terminals 41 and 46 of FIG. 1, acts as a short circuit, since the capacitive reactance of the capacitor 72 and 74 is initially zero. As the capacitors 72 and 74 charge the capacitive reactance thereof increases until the impedance between the terminals 70 and 71 is essentially an open circuit. As the impedance of the compensating circuit increases, the phase angle between the control voltage and the input voltage increases from zero to α, at which time the circuit is operating in a normal manner. Thus, the load 25 is allowed to warm up gradually and high surge currents to the SCR's 27 and 61 are eliminated. The resistor 76 discharges the capacitors 72 and 74 as the circuit is turned off and, hence, performs a reset function.

Figure 3:
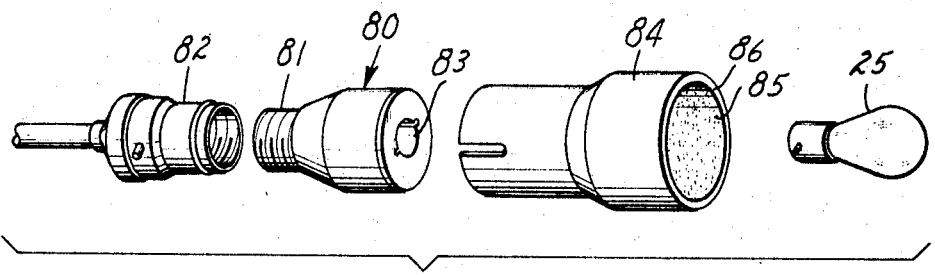
FIG. 3 is an exploded view in perspective of an embodiment of one application of the present voltage converter.

In FIG. 3 an embodiment of one application of the present voltage converter is illustrated. A housing generally indicated 80 contains the electronics schematically shown in FIG. 1. The left end 81 of the housing 80 in FIG. 3 is threaded and has contacts thereon so that it can be threadedly engaged in a standard socket such as illustrated at 82. It should also be understood that this connection could be made with the standard prongs or any of the other standard type electrical connections. An opening 83 in the right end of the housing 80 is adapted to receive the base of a tungsten filament light bulb 25 therein. Within the housing 80 the components, schematically illustrated in FIG. 1, are arranged so that there is a substantial air gap between the components and the right end thereof. This air gap acts as an insulator to prevent heat, produced by the light bulb 25, from affecting the electronic components.

A reflective shield 84 is constructed substantially cylindrically so that it slidably engages the housing 80 in a substantially coaxial relationship. The right end of the shield 84 has a conical reflective portion 85 therein which tends to focus the light from the bulb 25 outwardly in the desired direction. The conical portion 85 is attached to the inner surface of the cylindrical shield 84 by an insulating washer, not shown, and there is a space 86 therebetween which acts as an insulator to prevent heat from being conducted rearwardly to the housing 80.

In addition to the precautions mentioned above it should be noted that the circuitry illustrated in FIG. 1 has a built-in feature which tends to compensate for temperature changes of the components. The semi-conductor components, including SCR's 27 and 61 and the symmetrical diodes 38 and 53, have a tendency to trigger easier, or at a lower voltage, as their temperature increases. This is generally referred to as a positive temperature coefficient. As the semi-conductors trigger faster the output voltage increases since the point at which the SCR's 27 and 61 conduct appears earlier on the input voltage waveform. However, by making the capacitors 43 and 47 in the two phase shifting networks capacitors with a negative temperature coefficient this increase in output voltage is decreased. This occurs because the capacitors 43 and 47 (with a negative temperature coefficient) decrease the phase shift between the control voltage and the input voltage when the temperature increases, which reduces the output voltage. Therefore, the present voltage converter can be made relatively insusceptible to temperature changes.

It will be apparent to those skilled in the art that the phase angle between the input voltage and the control voltage can be varied to produce any desired amount of output voltage. Also, single circuit modifications might be incorporated whereby all of the output pulses are of the same polarity to provide a full wave rectified DC output, rather than the AC of the above described embodiment. One skilled in the art might also modify the present embodiment to utilize a device equivalent in function to back-to-back SCR's, which only requires control pulses to activate the device and allow current conduction in either direction.

Thus, a voltage converter is disclosed which does not utilize a transformer, therefore, giving it the advantages of being small, light weight and relatively inexpensive. Also, the present voltage converter is relatively insusceptible to changes in characteristics and operating temperatures of the included semi-conductor components. In addition to these advantages the present voltage converter is easily adaptable to a dimming circuit and/or an automatic surge compensating circuit. Since there are no surges of current through the switching circuits or the load the life expectancy of both is greatly increased.

This invention has been thoroughly tested and found to be completely satisfactory for the accomplishments of the above objects; and while I have shown and described a specific embodiment of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:
1. An alternating voltage converter comprising:
 (a) input means for receiving thereacross an alternating input voltage;
 (b) phase shifting means attached to said input means and when energized by an input voltage providing a control voltage which has a leading phase relationship relative to the input voltage;
 (c) pulse producing means producing at least a pulse of voltage per cycle of control voltage applied thereto, said pulses having a predetermined amplitude and a polarity opposite to that of the input voltage;
 (d) connecting means operatively attaching said pulse producing means to said phase shifting means for supplying said control voltage thereto;
 (e) output means for receiving an electrical load thereacross;
 (f) switching means connecting said output means to said input means in the activated mode, said switching means being characterized by providing a current path, when activated, for current of a given polarity to flow from said input means to said output means substantially the remainder of the portion of the then present input cycle which is at the given polarity; and
 (g) connecting means operatively attaching said switching means to said pulse producing means for supplying said pulses to said switching means and activating said switching means thereby.

2. An alternating voltage converter substantially as set forth in claim 1 wherein the pulse producing means includes semiconductor means requiring a predetermined breakover voltage applied thereto below which the resistance to electrical conduction is substantial and the switching means includes further semiconductor means requiring a pulse having a predetermined amplitude applied to a gate circuit therein to allow electrical conduction therethrough.

3. An alternating voltage converter substantially as set forth in claim 1 wherein said phase shifting means includes an R-C network and the magnitude of the components of said R-C network determines the R.M.S. amplitude of the output voltage.

4. An alternating voltage converter substantially as set forth in claim 3 wherein the switching means has as an additional characteristic a positive temperature coefficient which causes said switching means to switch at a slightly lower activating voltage as the temperature rises and the capacitance in the R-C network has a negative temperature coefficient which provides less phase shift between the input voltage and the control voltage whereby the output voltage remains substantially uniform over a relatively wide temperature range.

5. An alternating voltage converter substantially as set forth in claim 1 having in addition a high intensity, low voltage light source operatively attached to said output.

6. An alternating voltage converter substantially as set forth in claim 1 having in addition similar means for operating on both the positive and the negative half cycles of an alternating input voltage to produce an alternating output voltage of the desired magnitude.

7. An alternating voltage converter substantially as set forth in claim 6 wherein said converter includes two phase shifting means connected to the input to provide two control voltages each having a leading phase relationship relative to the input voltage.

8. An alternating voltage converter substantially as set forth in claim 7 having in addition variable means connected between the two phase shifting networks for varying the output voltage between maximum and zero.

9. An alternating voltage converter substantially as set forth in claim 7 having in addition automatic surge compensating means connected between the two phase shifting networks to prevent high initial surges of current through the switching means.

10. An alternating voltage converter substantially as set forth in claim 1 completely housed within a substantially cylindrical housing having a standard plug at one end thereof for engaging a standard electrical outlet and an outlet at the other end for receiving the load in engagement therewith, said housing being further characterized by having a heat insulating spacing between the electrical compenents therein and said outlet.

References Cited

UNITED STATES PATENTS

| | | | |
|---|---|---|---|
| 2,659,801 | 11/1953 | Collins | 315—194 |
| 3,192,466 | 6/1965 | Sylvan et al. | 323—22 |
| 3,300,711 | 1/1967 | Duncan | 323—22 |
| 3,331,013 | 7/1967 | Cunningham | 323—22 |

JOHN W. HUCKERT, *Primary Examiner.*

J. R. SHEWMAKER, *Assistant Examiner.*

U.S. Cl. X.R.

323—22, 24